United States Patent
Chen

(10) Patent No.: US 10,257,771 B2
(45) Date of Patent: Apr. 9, 2019

(54) DEVICE AND METHOD OF HANDLING SYSTEM INFORMATION

(71) Applicant: HTC Corporation, Taoyuan (TW)

(72) Inventor: Te-Ming Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 101 days.

(21) Appl. No.: 15/422,440

(22) Filed: Feb. 1, 2017

(65) Prior Publication Data

US 2017/0230897 A1     Aug. 10, 2017

Related U.S. Application Data

(60) Provisional application No. 62/291,534, filed on Feb. 5, 2016.

(51) Int. Cl.
*H04W 48/10* (2009.01)
*H04W 76/19* (2018.01)
*H04W 76/30* (2018.01)

(52) U.S. Cl.
CPC ........... *H04W 48/10* (2013.01); *H04W 76/19* (2018.02); *H04W 76/30* (2018.02)

(58) Field of Classification Search
CPC ...... H04W 48/10; H04W 76/19; H04W 76/30
See application file for complete search history.

(56) References Cited

U.S. PATENT DOCUMENTS

| | | | |
|---|---|---|---|
| 2013/0039287 A1* | 2/2013 | Rayavarapu | H04W 68/005 370/329 |
| 2013/0258888 A1 | 10/2013 | Jeong | |
| 2013/0303203 A1* | 11/2013 | Wang | H04W 68/00 455/458 |
| 2014/0010170 A1* | 1/2014 | Das | H04L 5/0094 370/329 |
| 2014/0016614 A1* | 1/2014 | Velev | H04W 4/70 370/331 |
| 2015/0249952 A1* | 9/2015 | Lee | H04W 4/06 370/312 |
| 2016/0212682 A1* | 7/2016 | Chung | H04W 76/14 |
| 2017/0311290 A1* | 10/2017 | Adjakple | H04W 76/18 |

FOREIGN PATENT DOCUMENTS

| | | |
|---|---|---|
| EP | 1909520 A1 | 4/2008 |
| WO | 2005125255 A1 | 12/2005 |
| WO | 2011121172 A1 | 10/2011 |

OTHER PUBLICATIONS

Search Report dated Jul. 28, 2017 for EP application No. 17153548.7, pp. 1-8.

(Continued)

*Primary Examiner* — Duc C Ho
(74) *Attorney, Agent, or Firm* — Winston Hsu

(57) ABSTRACT

A communication device for handling system information comprises a storage unit for storing instructions and a processing circuit coupled to the storage unit. The processing circuit is configured to execute the instructions stored in the storage unit. The instructions comprise receiving a radio resource control (RRC) connection release message from a network; and acquiring changed system information, after receiving the RRC connection release message and before initiating a RRC connection establishment procedure.

12 Claims, 4 Drawing Sheets

(56) References Cited

OTHER PUBLICATIONS

3GPP TSG-RAN WG2 #93 Tdoc R2-161086 Malta, Feb. 15-19, 2016 CR-Form-v11.1 Change Request 36.331 CR 2003 rev— Current version: 13.0.0.
3GPP TS 36.331 V13.0.0 (Dec. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 13).
3GPP TS 36.304 V13.0.0 (Dec. 2015) Technical Specification 3rd Generation Partnership Project; Technical Specification Group Radio Access Network; Evolved Universal Terrestrial Radio Access (E-UTRA); User Equipment (UE) procedures in idle mode (Release 13).

\* cited by examiner

DEVICE AND METHOD OF HANDLING SYSTEM INFORMATION

CROSS REFERENCE TO RELATED APPLICATIONS

This application claims the benefit of U.S. Provisional Application No. 62/291,534 filed on Feb. 5, 2016, which is incorporated herein by reference.

BACKGROUND OF THE INVENTION

1. Field of the Invention

The present invention relates to a device and a method used in a wireless communication system, and more particularly, to a device and a method of handling system information.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

The eNB may move a UE to a RRC_IDLE state, if the eNB determines that the UE needs to acquire changed system information. However, there is no mechanism for the UE to check if it already has (or obtains) up-to-date system information, before the UE initiates a connection establishment procedure. According to the prior art, the UE obtains system information just enough for entering a RRC_CONNECTED mode. In this situation, the UE may initiate the connection establishment procedure before acquiring all changed system information, and the connection establishment procedure may be failed. Accordingly, the eNB may release the UE to ask the UE to acquire the changed system information. Again, the UE may not obtain all the changed system information, i.e., a deadlock is caused to the interaction between the eNB and the UE. Thus, how the UE handles the system information is an important to be solved.

SUMMARY OF THE INVENTION

The present invention therefore provides a communication device and method for handling system information to solve the abovementioned problem.

A communication device for handling system information comprises a storage unit for storing instructions and a processing circuit coupled to the storage unit. The processing circuit is configured to execute the instructions stored in the storage unit. The instructions comprise receiving a radio resource control (RRC) connection release message from a network; and acquiring changed system information, after receiving the RRC connection release message and before initiating a RRC connection establishment procedure.

A communication device for handling system information comprises a storage unit for storing instructions and a processing circuit coupled to the storage unit. The processing circuit is configured to execute the instructions stored in the storage unit. The instructions comprise receiving a radio resource control (RRC) connection release message from a network; and acquiring all system information, after receiving the RRC connection release message and before initiating a RRC connection establishment procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
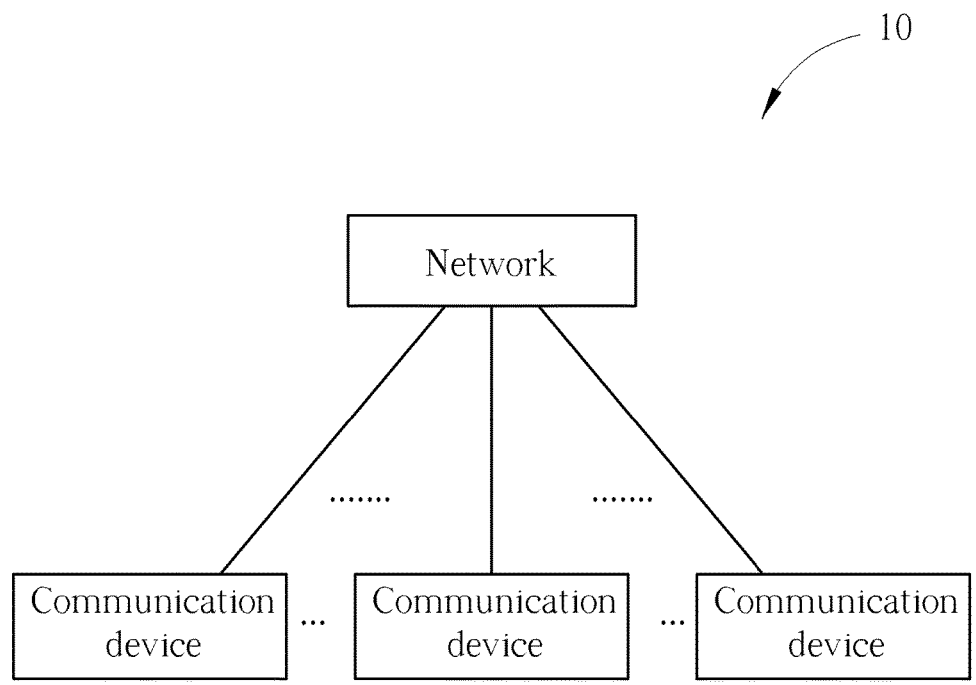
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (PCell) and one or more secondary cells (SCells). The abovementioned cells may be operated in the same or different frame structure types, or in the same or different duplexing modes, i.e. frequency-division duplexing (FDD) and time-division duplexing (TDD). For example, the PCell may be operated on a licensed carrier, while the SCell may be operated on an unlicensed carrier.

In FIG. 1, the network and the communication devices are simply utilized for illustrating the structure of the wireless communication system 10. Practically, the network may be a narrowband (NB) internet of things (IoT) network or an evolved universal terrestrial radio access network (E-UTRAN) including at least one evolved Node-B (eNB). The network may be a fifth generation (5G) network including at least one 5G base station (BS) which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the eNB and the 5G BS.

Furthermore, the network may also include the GERAN/UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. The GERAN is an abbreviation of Global System for Mobile Communications (GSM) Enhanced Data rates for GSM Evolution (EDGE) Radio Access Network. In other words, after the network receives information transmitted by a communication device, the information may be processed only by the UTRAN/E-UTRAN and decisions corresponding to the information are made at the UTRAN/

E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
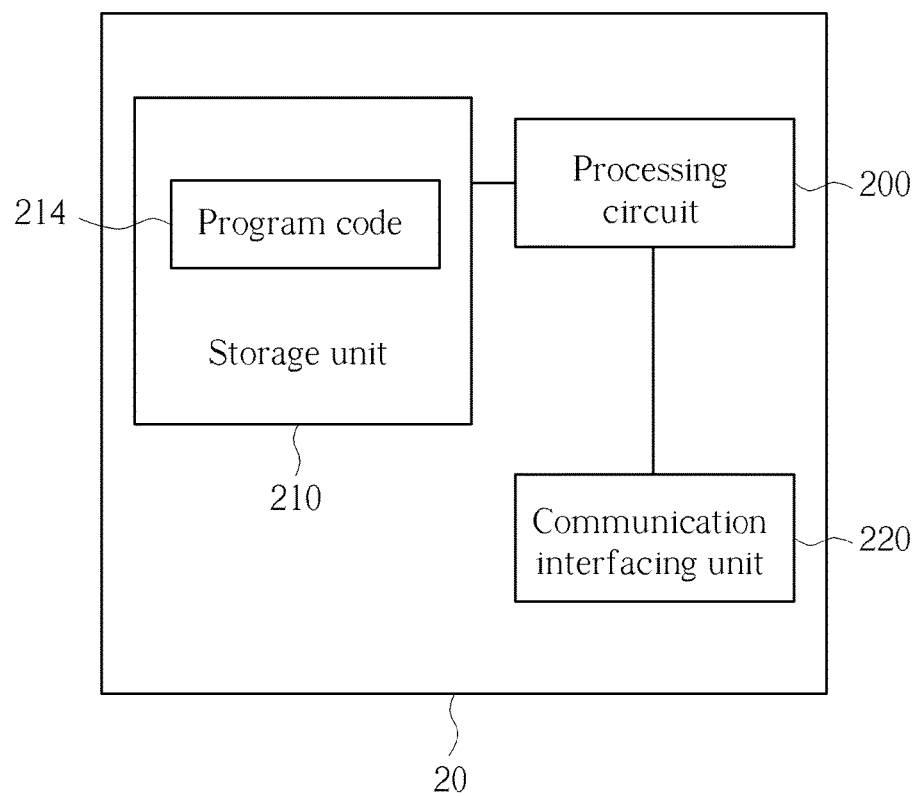
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
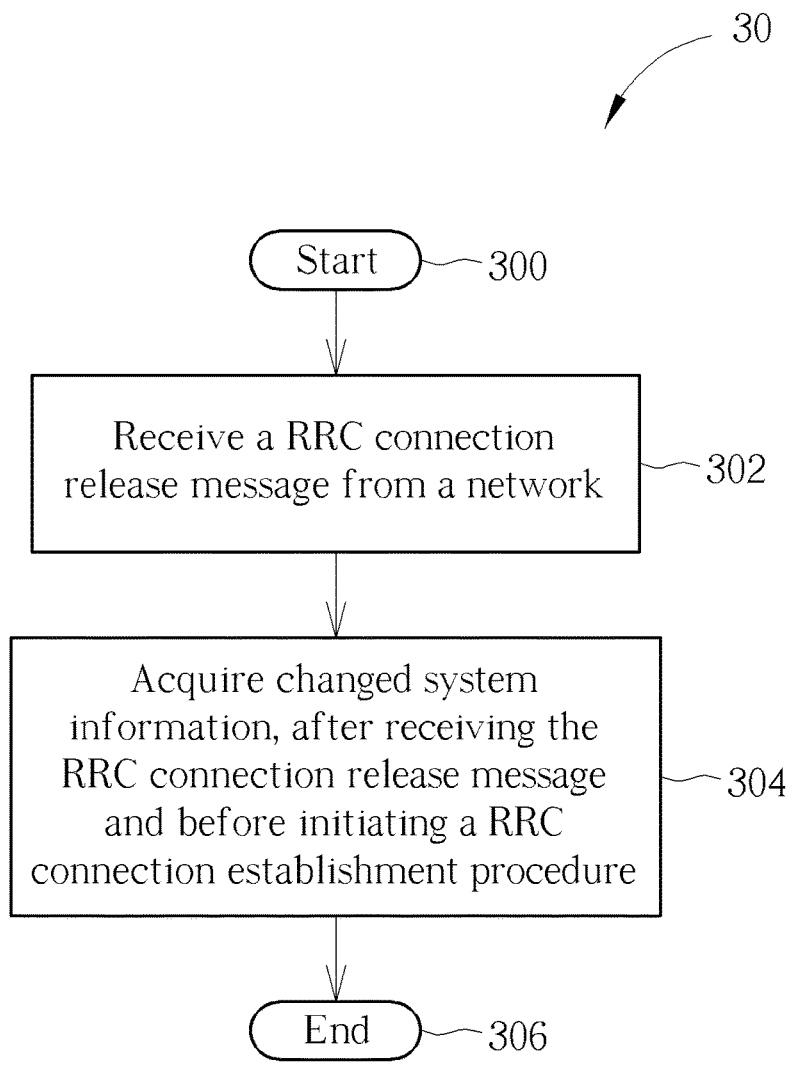
FIG. 3 is a flowchart of a process according to an example of the present invention.

FIG. 3 is a flowchart of a process 30 according to an example of the present invention. The process 30 may be utilized in a UE, for handling system information. The process 30 may be compiled into the program code 214 and includes the following steps:

Step 300: Start.
Step 302: Receive a radio resource control (RRC) connection release message from a network.
Step 304: Acquire changed system information, after receiving the RRC connection release message and before initiating a RRC connection establishment procedure.
Step 306: End.

The network may change content of system information broadcasted in a cell of the network. For example, the network may change a value tag of the system information to indicate that there is a system information change and/or which system information is changed. The network may decide that a UE needs to acquire (or reacquire) the changed system information, and may send a RRC connection release message to the UE. According to the process 30, the UE receives the RRC connection release message from the network. Then, the UE acquires changed system information, after receiving the RRC connection release message and before initiating a RRC connection establishment procedure. That is, the UE obtains all the changed system information, such that the RRC connection establishment procedure can be initiated properly according to the changed system information. Thus, the problem that the UE (e.g., in a RRC_IDLE mode) only obtains system information (which is not all the changed system information) sufficient for entering a RRC_CONNECTED mode is solved.

Realization of the process 30 is not limited to the above description. The following examples may be applied to the process 30.

There are various ways for identifying (or recognizing) when or which system information is changed. In one example, the changed system information is first system information broadcasted by the network, and is different from second system information stored in the UE. That is, all or part of all system information which is different from the stored system information is treated as the changed system information, and the UE acquires all the changed system information accordingly. In one example, the UE compares a first value tag stored in the first system information and a second value tag in the second system information, and considers the first system information as the changed system information if the first value tag and the second value tag are different. That is, all or part of all system information with a value tag different from the stored value tag is treated as the changed system information, and the UE acquires all the changed system information accordingly.

In one example, the UE stores third system information broadcasted by the network, and starts a timer (e.g., valid timer) for the third system information. Then, the UE considers fourth system information broadcasted by the network as the changed system information, if the timer expires. That is, whether the stored system information is valid (or invalid) is determined according to the timer. The UE decides that the stored system information is invalid, i.e., the stored system information is changed, if the timer expires. In one example, the changed system information may include (or simply be) system information for enhanced coverage (EC).

In one example, the RRC connection release message may include a release cause. That is, the UE acquires the changed system information, if the release cause is received in the RRC connection release message. In this situation, the UE does not acquire the changed system information, if the RRC connection release message does not include the release cause. Further, the release cause may be configured with (i.e., set to) a first value. That is, the UE acquires the changed system information, if the release cause configured with the first value is received in the RRC connection release message. In this situation, the UE does not acquire the changed system information, if the release cause is configured with a second value different from the first value.

In one example, the RRC connection release message may include an indicator. That is, the UE acquires the changed system information, if the indicator is received in the RRC connection release message. In this situation, the UE does not acquire the changed system information, if the RRC connection release message does not include the release cause. Further, the indicator may be configured with (i.e., set to) a "TRUE" value. That is, the UE acquires the changed system information, if the release cause configured with the "TRUE" value is received in the RRC connection release message. In this situation, the UE does not acquire the changed system information, if the release cause is configured with a "FALSE" value.

Figure 4:
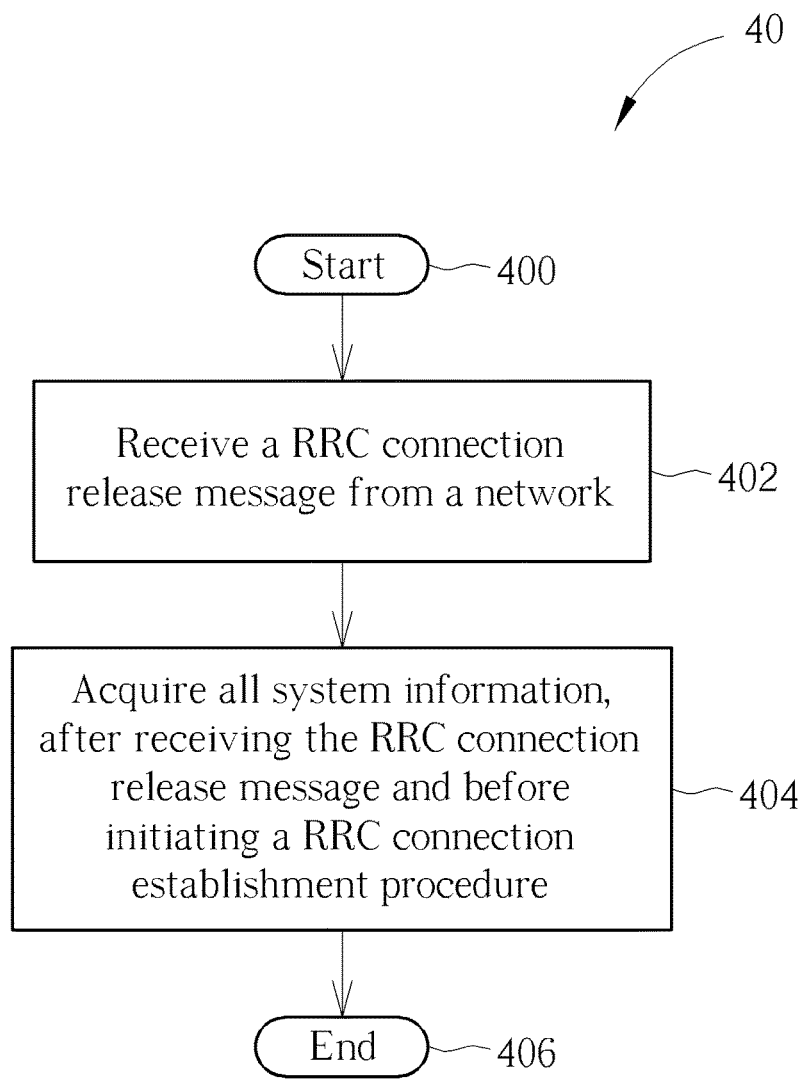
FIG. 4 is a flowchart of a process according to an example of the present invention.

FIG. 4 is a flowchart of a process 40 according to an example of the present invention. The process 40 may be utilized in a UE, for handling system information. The process 40 may be compiled into the program code 214 and includes the following steps:

Step 400: Start.
Step 402: Receive a radio resource control (RRC) connection release message from a network.
Step 404: Acquire all system information, after receiving the RRC connection release message and before initiating a RRC connection establishment procedure.
Step 406: End.

The network may change content of system information broadcasted in a cell of the network. For example, the network may change a value tag of the system information to indicate that there is a system information change and/or which system information is changed. The network may decide that a UE needs to acquire (or reacquire) the changed system information, and may send a RRC connection release message to the UE. According to the process 40, the UE receives the RRC connection release message from the network. Then, the UE acquires all system information, after receiving the RRC connection release message and before initiating a RRC connection establishment procedure. That is, the UE obtains all the system information (including changed system information and unchanged system information), such that the RRC connection establishment procedure can be initiated properly according to the changed system information. Thus, the problem that the UE (e.g., in a RRC_IDLE mode) only obtains system information (which is not all the changed system information) sufficient for entering a RRC_CONNECTED mode is solved.

Realization of the process 40 is not limited to the above description. The following examples may be applied to the process 40.

In one example, the changed system information may include (or simply be) system information for EC.

In the above examples related to the process 30 and/or 40, the UE may be a Bandwidth reduced Low complexity (BL) UE or a UE in EC.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

To sum up, the present invention provides a device and a method for handling system information. Accordingly, a UE can obtain the system information correctly. The problem that the UE (e.g., in a RRC_IDLE mode) only obtains system information (which is not all the changed system information) sufficient for entering a RRC_CONNECTED mode is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling system information, comprising:
a storage unit, for storing instructions of:
receiving a radio resource control (RRC) connection release message from a network;
acquiring changed system information, after receiving the RRC connection release message and before initiating a RRC connection establishment procedure, wherein the changed system information is first system information broadcasted by the network, and is different from second system information stored in the communication device;
comparing a first value tag in the first system information and a second value tag in the second system information; and
considering the first system information as the changed system information, when the first value tag and the second value tag are different; and
a processing circuit, coupled to the storage unit, configured to execute the instructions stored in the storage unit.

2. The communication device of claim 1, wherein the storage unit further stores the instructions of:
storing third system information broadcasted by the network;
starting a timer for the third system information; and
considering fourth system information broadcasted by the network as the changed system information, if the timer expires.

3. The communication device of claim 1, wherein the changed system information comprises system information for enhanced coverage (EC).

4. The communication device of claim 1, wherein the RRC connection release message comprises a release cause.

5. The communication device of claim 4, wherein the storage unit further stores the instruction of:
not acquiring the changed system information, when the RRC connection release message does not comprise the release cause.

6. The communication device of claim 4, wherein the release cause is configured with a first value.

7. The communication device of claim 6, wherein the storage unit further stores the instruction of:
not acquiring the changed system information, when the release cause is configured with a second value different from the first value.

8. The communication device of claim 1, wherein the RRC connection release message comprises an indicator.

9. The communication device of claim 8, wherein the storage unit further stores the instruction of:
not acquiring the changed system information after receiving the RRC connection release message, when the RRC connection release message does not comprise the indicator.

10. The communication device of claim 8, wherein the indicator is configured with a "TRUE" value.

11. The communication device of claim 10, wherein the storage unit further stores the instruction of:
not acquiring the changed system information after receiving the RRC connection release message, when the indicator is configured with a "FALSE" value.

12. The communication device of claim 1, wherein the communication device is a Bandwidth reduced Low complexity (BL) user equipment (UE) or a UE in EC.

* * * * *